United States Patent [19]

Mei et al.

[11] 4,341,088
[45] Jul. 27, 1982

[54] HIGHWAY VEHICLE EXHAUST GAS REFRIGERATION SYSTEM

[76] Inventors: Viung C. Mei, 129 Brentwood Dr., Oak Ridge, Tenn. 37830; Zalman Lavan, 947 Ridge Ct., Evanston, Ill. 60202; Sushil K. Chaturvedi, 7740 Enfield Ave., Apt. 103, Norfolk, Va. 23505

[21] Appl. No.: 158,562

[22] Filed: Jun. 11, 1980

[51] Int. Cl.³ .................................................. B60H 3/04
[52] U.S. Cl. ................................. 62/239; 62/238.3; 62/243; 62/323.2; 62/430
[58] Field of Search ................ 62/238.3, 239, 243, 62/323.2, 82, 430

[56] References Cited

U.S. PATENT DOCUMENTS

| | | | |
|---|---|---|---|
| 2,118,739 | 5/1938 | Schulman | 62/323.2 X |
| 2,592,712 | 4/1952 | Knoy | 62/239 X |
| 2,884,768 | 5/1959 | Gould | 62/243 X |
| 2,986,014 | 5/1961 | Schilling | 62/82 X |
| 2,990,694 | 7/1961 | Kummerlowe et al. | 62/323.2 X |
| 3,055,187 | 9/1962 | Rogers | 62/239 X |
| 3,077,083 | 2/1963 | Kubo et al. | 62/239 |
| 3,101,599 | 8/1963 | Pippert, Sr. et al. | 62/239 X |
| 3,156,101 | 11/1964 | McGuffey | 62/430 X |
| 3,228,205 | 1/1966 | Franklin | 62/430 X |

OTHER PUBLICATIONS

Elonka & Minich, *Standard Refrigeration and Air Conditioning Questions & Answers,* New York, McGraw Hill, 1961, p. 17.

*Primary Examiner*—Lloyd L. King
*Attorney, Agent, or Firm*—Dressler, Goldsmith, Shore, Sutker & Milnamow, Ltd.

[57] ABSTRACT

An energy efficient absorption refrigeration system is described that is mounted on a highway vehicle, such as a truck, and that is driven by the hot exhaust gases discharged from the engine. Eutectic plates are used as the evaporator section of the refrigeration system. A novel generator-analyzer is mounted between the engine and the muffler of the truck. An efficient absorbent recirculation loop improves the efficiency of this system. Control problems are minimized by incorporating eutectic plate storage systems with the efficient absorbent recirculation loop and compact generator-analyzer. The system is designed for a variety of refrigerant-absorbent combinations.

6 Claims, 4 Drawing Figures

FIG. 2
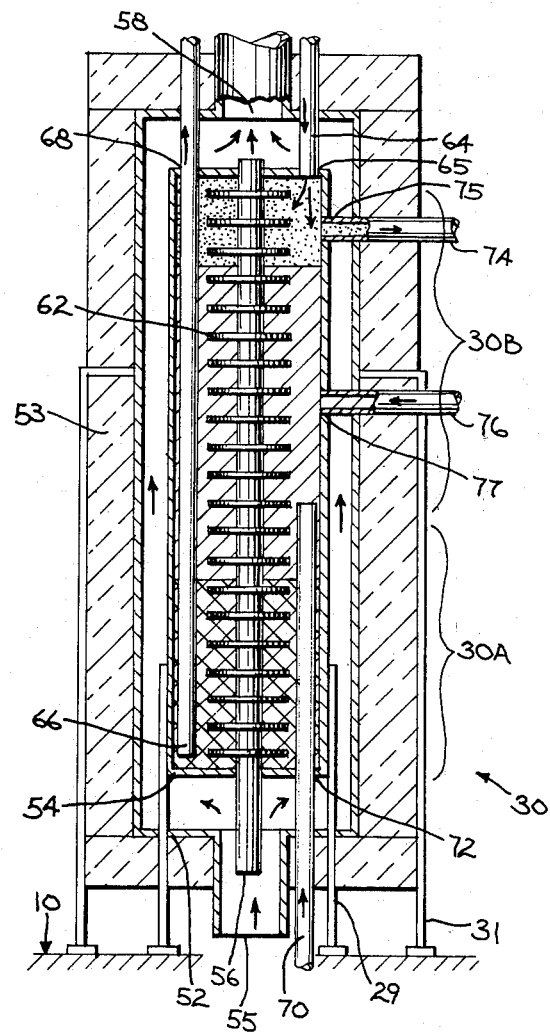
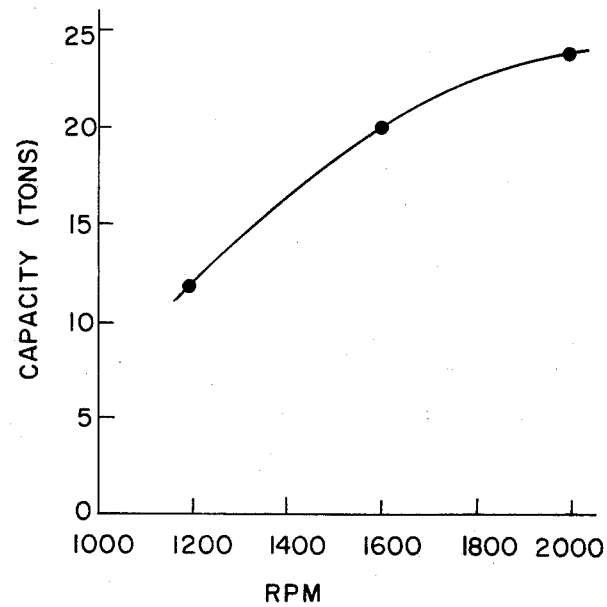
FIG. 4
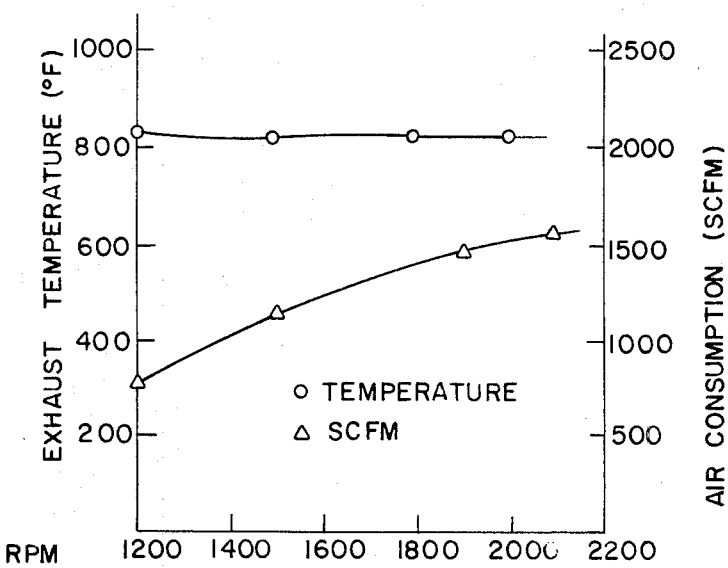
FIG. 3

HIGHWAY VEHICLE EXHAUST GAS REFRIGERATION SYSTEM

DESCRIPTION

1. Technical Field

This invention relates generally to an absorption refrigeration system utilizing the waste heat produced by exhaust gases of a heat engine. In particular, it is concerned with an improved generator-analyzer and an absorption refrigeration system installed on intercity vehicles utilizing a eutectic plate evaporator.

2. BACKGROUND OF THE INVENTION

The upward thrust of energy costs coupled with the decreasing availability of energy make it mandatory that consideration be given to every conceivable method of energy utilization and conservation.

Since the oil embargo in 1973, oil prices have reached a level detrimental to the economic growth of industrialized nations. The U.S. dependence on foreign oil has increased rapidly due to ever-growing consumption which has outstripped the domestic oil supply. The prevailing high energy prices have provided new incentive to develop and apply energy conservation technology with the viewpoint of reducing fuel consumption.

It is estimated that 25 percent of all U.S. energy consumption is centered in the transportation sector. Automobiles and trucks alone account for approximately 80 percent of all transportation energy expenditures. These internal combustion engines have typically a thermal efficiency of 40 percent. The remaining energy is rejected to the atmosphere in the form of hot exhaust gases or as energy convected from the radiator and the engine. Much work is now in progress that is directed to the improvement of thermal efficiency by achieving better consumption of the fuel. Some effort has been devoted to the utilization of the vast amount of waste energy dissipated in the exhaust gases. Unfortunately, few have focused on using the waste heat for air-conditioning and refrigeration. Refrigeration systems are used to deliver perishable food such as milk, vegetables, fruits and meat. These products are virtually essential to the maintenance of the American way of life. Because it is so vital, refrigerated trucks and vehicles will continue to dominate the transportation sector of our economy.

A literature search on the subject of utilization of waste heat for refrigeration shows that most of the previous work has been limited to schemes that utilize automobile exhaust gases for air-conditioning. C. L. Keating, Jr. (U.S. Pat. No. 2,667,040); R. W. Kroger (U.S. Pat. No. 3,021,690); S. G. Hause (U.S. Pat. No. 3,142,161); and T. J. McNamara (U.S. Pat. No. 3,661,200) are typical examples of the prior work in this area of endeavor. Since energy was until recently relatively inexpensive, very little effort was made to develop these patented devices. Moreover, a careful examination of the above reference will reveal that most of the schemes are inadequate if not completely inoperative from a thermodynamic point of view. In view of the current energy crisis, the use of engine exhaust gases to power an absorption refrigeration system was re-evaluated.

The feasibility of an exhaust gas-powered automobile air-conditioning system was reviewed by J. R. Ackerman in his paper "Automotive Air-Conditioning Systems With Absorption Refrigeration", SAE Publication No. 710037, 1969. Ackerman concluded that such systems are *not* feasible due to the lack of "cooling potential" in the exhaust gases at low and idling speeds. This conclusion was independently confirmed by the inventors of the present patent application.

Another investigator, M. P. Boyce, proposed a gas turbine-powered air-conditioning system for a turbocharged diesel engine. M. P. Boyce proposed this device in his paper "The Utilization of Internal Combustion Exhaust Gases for Air-Conditioning", 1971, Intersociety Energy Conversion Engineering Conference Proceedings, page 38. Boyce, in effect, modified an air-conditioning system used extensively in aircraft.

To the best of the inventors' knowledge, none of these proposed designs has ever been built. Quite frankly, they are inadequate and not at all practicable. More importantly, they can be shown to be economically unsound. For example, Eannarino and Garnieri (U.S. Pat. No. 3,535,888) note that insufficient heat is present in the automobile exhaust system when the engine is running at low speed. Eannarino in U.S. Pat. No. 3,285,709 proposed an "after burner" to increase the temperature of the exhaust gases. Eannarino and Granieri teach a variation of the after burner concept. Burning more fuel to recover part of the exhaust gas heat wastes valuable primary energy resources in an effort to make a basically unsound system work.

Existing truck refrigeration equipment can be divided into three main categories. The most widely used system utilizes a vapor compression machine powered by an auxiliary engine run on gasoline. Some trucks use a eutectic solution plate refrigeration storage system. Still others use expendable liquid nitrogen or a carbon dioxide spray system. All of these systems consume precious fuel or electricity to achieve refrigeration.

A specific example may put this in better perspective. For a typical diesel truck engine running at 2,100 RPM, the intake air flow is around 1525 SCFM and the exhaust gas temperature is about 800° F. Assuming an engine air to fuel ratio of 15, an ambient air temperature of 100° F. and an air density and specific heat of 0.07 lbm/ft$^3$ and 0.25 BTU/lbm° F., respectively, the total heat rejected from the exhaust system is estimated to be 1,195,600 BTU/hr. If 20 percent of the rejected waste heat is collected and a refrigeration system is used having a coefficient of performance (COP) of 0.5, then approximately 10 tons of refrigeration capacity is potentially available.

Assuming that there are one million refrigerated trucks (out of estimated 30 million trucks on the road), and each uses a 5 HP gasoline engine-powered refrigeration compressor, the potential annular savings of fuel by converting to an absorption refrigeration system powered by exhaust gases can be calculated. If it is assumed that the gasoline engine has a thermal efficiency of 35 percent and that the heat value of gasoline is 120,000 BTU/gallon, then for a refrigerated truck operating 8 hours a day, 5 days a week and 50 weeks a year, the fuel savings can be shown to be 600 gallons/year. For one million trucks, the fuel savings will be 600 million gallons (15 million barrels) annually. This is belived to be a conservative estimate of the magnitude of the fuel savings that can be achieved by refrigeration systems using engine exhaust gas waste heat.

Based on these estimates, an exhaust gas-powered absorption refrigeration system is very attractive. It offers a great amount of fuel conservation and would go far in alleviating the current energy crisis. Another attractive feature is that such a system is noise-free and practically maintenance-free. More importantly, it can be shown to be competitive from a first-cost point of view.

SUMMARY OF THE INVENTION

In accordance with the present invention, exhaust gases from a truck or other large engine are used to drive an absorption refrigeration system. Specifically, a novel generator-analyzer and an efficient absorbent recirculation loop are used to extract the maximum amount of waste heat from the engine exhaust gases without developing an excessive pressure drop in the exhaust system. In addition, a eutectic plate storage system is incorporated as the evaporator for the system to moderate the fluctuations in cooling due to variations in vehicle speed and engine power and thus simplify control of the refrigeration system. An absorption refrigeration cycle is used to cool the eutectic plates and transfer heat from exhaust gases. The system has no moving parts with the exception of one small electric motor-driven circulation pump. Since the operating cost of the system is negligible and since it is virtually maintenance-free, it not only improves truck operating costs but also reduces the consumption of oil and gasoline products. Finally, the novel design is economical relative to maintenance-prone, noisy, short-lived vapor compression refrigeration systems.

A three-ton vapor compression refrigeration system has an estimated first cost of $3,000.00. The capital cost or first cost of an absorption refrigeration system of the type descibed is approximately the same. However, when fuel costs are considered, a trucking company operating a fleet of 250 trucks would have an annular savings approximately $1,000,000.00 without consideration being given to the savings in maintenance costs. Thus, the present invention is both practical and energy-efficient.

Numerous other advantages and features of the present invention will become readily apparent from the following detailed description of the invention and the embodiments thereof, from the claims and from the accompanying drawings in which each and every detail shown is fully and completely disclosed as part of this specification, and in which like numerals refer to like parts.

BRIEF DESCRIPTION OF THE DRAWINGS

FIG. 2 is a cross-sectional, elevational view of the generator-analyzer shown in FIG. 1;

FIG. 3 is a graph showing the relationship between engine RPM, exhaust temperature and air consumption; and FIG. 4 is a graph illustrating the relationship between refrigeration capacity and engine RPM.

DETAILED DESCRIPTION

Figure 1:
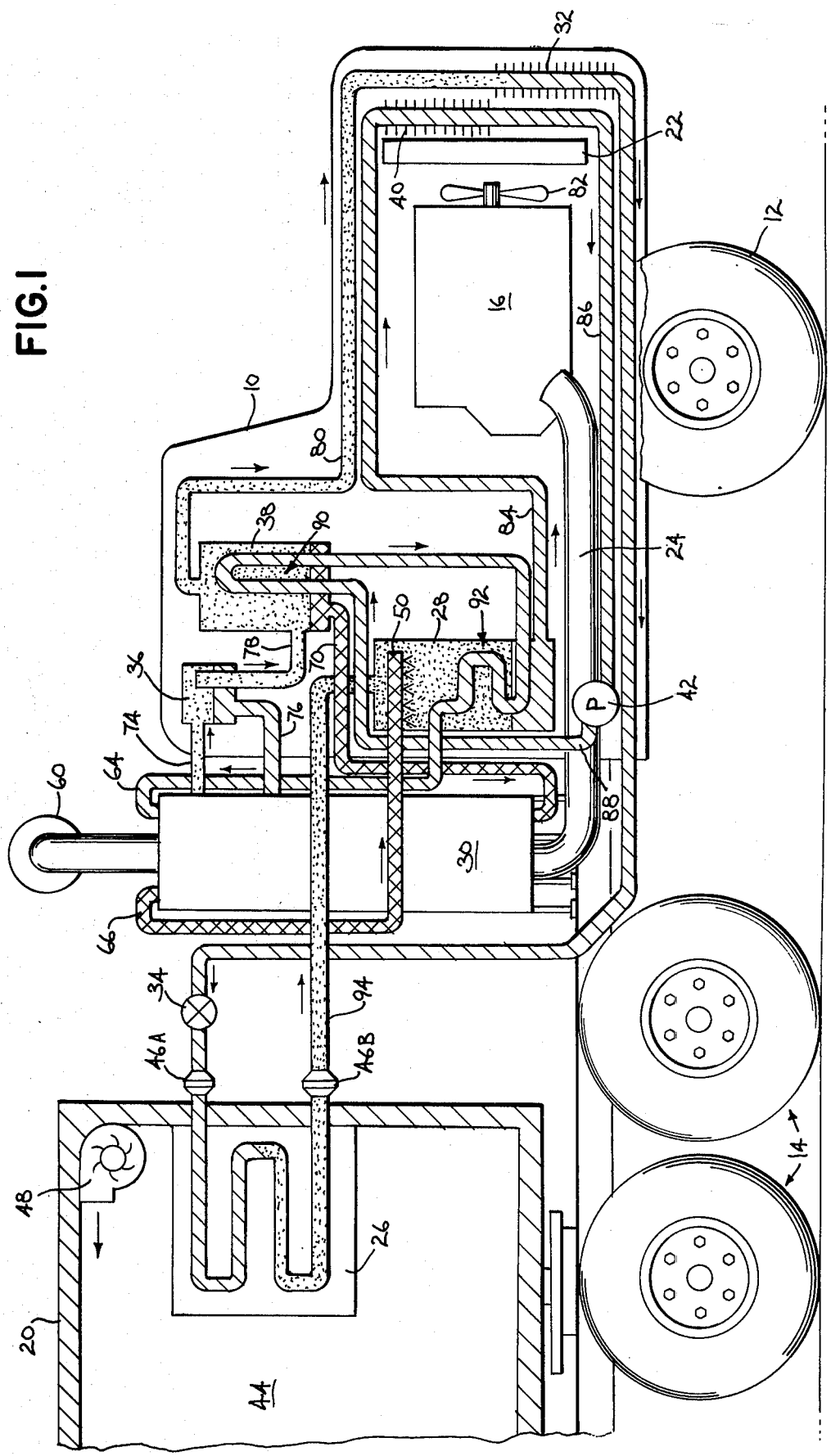
FIG. 1 is a schematic representation of an absorption refrigeration system installed on a tractor-trailer.

While this invention will be described in connection with the preferred embodiments, it will be understood that it is not intended to limit the invention to those specific embodiments. On the contrary, it is intended to cover all alternatives, modifications and equivalents as may be included within the spirit and scope of the invention as defined by the appended claims.

Before describing the present invention in detail, it is important to estimate the maximum possible cooling potential available from the exhaust gases of an internal combustion engine. FIG. 3 shows the exhaust gas temperature and air consumption of a truck as a function of vehicle speed. For a given speed, the mass flow rate of exhaust gases can be computed assuming that all the mass entering the engine is expelled through the exhaust system. The total available energy in the exhaust gases is:

$$Q_a = m\, C_p (T_e - T_a)$$

where: m is the exit mass flow rate; $C_p$ is the specific heat; $T_e$ is the exhaust temperature; and $T_a$ is the ambient air temperature. If it is assumed that only a fraction, f, of the total available energy $Q_a$ is transferred out of the exhaust gases into a heat exchanger, then the cooling potential is:

$$Q_e = f(COP) Q_a$$

where COP is the Coefficient of Performance of the absorption refrigeration system to which the heat exchanger is connected. FIG. 4 shows the cooling potential for a truck as a function of operating speed. Typically, truck refrigeration requirements are in the range of 1 to 5 tons. Thus, as seen from FIG. 4, the available cooling potential is one order of magnitude larger than typical refrigeration truck requirements. This factor is needed to design the generator-analyzer so as to be cost-effective. In other words, it is desirable to match the generator-analyzer to the potential load. The generator-analyzer should be neither too small or too large.

Another important factor affecting the design of the generator-analyzer is to minimize the pressure drop in the exhaust system from the engine. This is important in order that engine performance and fuel economy is not adversely affected by the presence of the generator-analyzer. For purposes of calculation, the generator-analyzer is designed for a two-ton capacity refrigeration system with an estimated coefficient of performance (COP) of 0.5. Under these assumptions 48,000 BTUs of heat must be transferred to the absorption refrigeration system generator-analyzer to produce an evaporator cooling load of 24,000 BTUs per hour. In addition, it was assumed that the temperature of fluid within the generator-analyzer is 300° F. and that the mass flow rate is 100 pounds per minute with an average exhaust temperature of 700° F. It was also assumed that fluid in the generator-analyzed undergoes boiling (i.e. resistance contribution due to the metal of the wall is negligible). Finally, it was assumed that the exhaust gases undergo turbulent flow in passing through the generator-analyzer. Table 1 summarizes the calculations:

TABLE 1

| SUMMARY OF HEAT EXCHANGER CALCULATION | | |
|---|---|---|
| Parameter | Case I | Case II |
| Exhaust Flow Rate | 1200 SCFM | 1200 SCFM |
| Exhaust Gas Temperature | 700° F. | 700° F. |
| Generator Temperature | 300° F. | 300° F. |
| Reynolds Number | $1.2 \times 10^5$ | $0.32 \times 10^5$ |
| Heat Exchange Area | 2.8 FT$^2$ | 8.3 FT$^2$ |
| Length | 3.5 FT | 3.54 FT |
| Pressure Drop | 0.136 psi | 0.016 psi |
| Tube Diameter | 3" | 3" |
| Inside Diameter | — | 6" |
| Outside Diameter | — | 8" |

In Case I, the exhaust gas is assumed to flow entirely through the central pipe. In Case II, air flows through both the central pipe and the outer shell. Based on an analysis of these results, a heat exchanger in which there is flow through both the central pipe and the outer shell is preferable. It can be seen that the area (size requirements) and pressure drops are reasonable and acceptable. In addition, the pressure drop and due to the heat exchanger is relatively small and unlikely to affect engine performance. Most importantly, the heat exchanger is reasonably sized and can easily be accommodated between the muffler and the engine.

FIG. 1 is an overall representation of the absorption refrigeration system that is the subject of the present invention. Basically, the absorption refrigeration system is installed on the body or frame 10 of a truck or other vehicle propelled by a heat engine. As shown in FIG. 1, the truck is the tractor portion of a tractor-trailer or trailer-truck. The frame 10 of the truck is supported by a set of wheels. A set of steering wheels 12 is located at the front end of the truck, and a set of load-bearing wheels 14 is joined to the frame 10 at the rear end of the truck. The truck frame 10 supports an engine 16 and an insulated enclosure or trailer 20, at the rear end of the truck. At the front end of the engine 16 the frame supports a radiator 22 to cool the engine 16. Exhaust gases are passed from the engine 16 via an exhaust manifold and pipe 24.

Installed within the body of the trailer 20 is a refrigeration storage tank or plate 26 which serves as the evaporator portion or the cooling portion of the absorption refrigeration system. Specifically, a eutetic plate storage system is preferred. Such a device enables excess refrigeration capacity to be stored when truck is running at full speed. In addition, stored refrigeration capacity can then be used when the truck engine 16 is shut off or is running at slow speed. Finally, the eutectic system moderates the pressure fluctuations of the refrigeration system and improves the stability of the refrigeration system. This stabilization effect makes the system especially advantageous.

It will be recalled that an absorption refrigeration system employs a refrigerant, an absorbent, and a source of heat to create a refrigeration cycle and cooling effect similar to that created by a compression refrigeration system. The basic cycle employs no moving parts. It depends, rather, upon the action and reaction between refrigerants and absorbents under various pressure and temperature conditions.

A word on nomenclature is in order. If the substance involved is a solid, the process between the refrigerants and the absorbent is sometimes called adsorbing; if the substance is a liquid, the process is sometimes called absorbing. In any case, the system utilizes the cooling effect of liquids flashing to a vapor and the condensing effect of changing the vapor to a liquid by removing heat. Action within the absorption refrigeration cycle is primarily dependent on heat being applied at a key point and on the strong attraction of refrigerant moisture to the absorbent.

For the purpose of orientation, the overall absorption refrigeration cycle will be described. Afterwards, the details of each component of the system will be discussed at length. Throughout this discussion it must be kept in mind that liquids boil or vaporize more quickly at a low pressure and in a vacuum, and that the absorbent has the ability to rapidly absorb moisture by definition.

Referring to FIG. 1, refrigerant is forced to pass under low pressure to an evaporator 26. There, some of the refrigerant will flash to a vapor. This vaporization cools the remaining refrigerant liquid and removes additional heat from the evaporator 26. The pick-up of heat causes more refrigerant to vaporize and this in turn causes a greater cooling effect. After the refrigerant vapor has picked up heat, it flows to an absorber tank or absorbent tank 28 due to the drawing action of the absorbent in the absorber tank 28. In the absorber tank 28, the refrigerant vapor mixes with, or is dissolved in, the liquid absorbent. This process, in a sense, absorbs or compresses the refrigerant vapor into a liquid mixture. The drawing and absorbing action of the absorbent tends to cause the pressure difference between the absorber tank 28 and the evaporator 26. During this absorption phase latent heat is rejected.

The liquid mixture within the absorber tank 28 is then passed to the generator-analyzer 30 via a recirculation or solution pump 42 where it is heated until the absorbent and refrigerant percolate or boil. When this occurs, the refrigerant vaporizes and separates from the liquid absorbent. The heat added in the generator-analyzer 30 increases the pressure.

In the vapor state and under pressure, the refrigerant then passes to the condenser 32 where the heat is removed. As the condenser 32 removes heat, the relatively high-pressure refrigerant vapor changes to a high-pressure liquid. The function of the condenser in an absorption refrigeration system is very similar to the function of a condenser in a vapor compression system; specifically, it removes heat and causes the refrigerant vapor to condense into a liquid. Finally, the liquid refrigerant flows through a metering device 34 (typically an expansion valve or an orifice) where it flashes into the evaporator 26 where the cycle begins again.

The basic components of an absorption refrigeration system are: the evaporator 26; the absorber 28 the generator-analyzer 30 the condenser 32; and the expansion valve 34. For greater efficiency and improved performance, the following additional components are provided: a leveling chamber 36; a rectifier 38; an absorber heat exchanger 40; and the recirculation pump 42. The basic function and purpose of these components will now be described.

EVAPORATOR

The evaporator 26 is essentially a heat transfer chamber in which heat flows from the object being cooled (ex: eutetic plates, chilled water system, etc.) to the refrigerant. Heat originates in the space, 44, being cooled. In the preferred embodiment, eutetic plates are used. Eutetic plates 26 act as evaporators and refrigeration capacity storage (hold-over) units. They can be charged before shipment of the refrigerated enclosure 20 by connecting the plates, via a set of plug-in connections 46A and 46B, to an off-truck condensing unit or large-capacity refrigeration plant installed in the garage. When the truck is on the road, it is charged continually by the absorption refrigeration system installed on the vehicle. During the initial charging process, the liquid contained within the eutetic plates becomes frozen. This maintains the required low temperature within the refrigerated enclosure 20. Afterwards, when the truck is on the road, the stored refrigeration capacity is used when the engine 16 is running at low speed or is stopped temporarily. Preferably, the storage capacity of the eutetic plates 26 will be sufficient to provide adequate cooling to the refrigerated space 44 during the normal layover period—about 8 to 10 hours—of a long-haul refrigeration truck driver between shifts. Campers and large recreation vehicles or motor homes can similarly use the stored capacity when the vehicle is stopped temporarily or overnight. A recirculation fan 48 is provided within the enclosure 20 to insure uniform cooling throughout the refrigerated space 44.

ABSORBER TANK

The refrigerant vapor, attracted by the absorbent within the absorber tank 28, carries the heat from the evaporator to the absorbent tank. The absorber tank 28 contains the absorbent that attracts the refrigerant vapor from the evaporator 26 and carries the absorbent to the generator-analyzer 30 in a mixed-liquid state. The refrigerant is usually absorbed so rapidly that this action causes a low-pressure condition in the evaporator 26. The process also tends to generate heat in the absorber tank 28 since the refrigerant vapor is changed to a liquid in the process of being absorbed. During the process of absorption, the following occurs:

1. The weak solution is converted to a strong solution;
2. The latent heat of condensation develops, raising the temperature of the solution;
3. The heat of dilution develops to help raise the temperature of the solution; and
4. The vapor pressure of the refrigerant is reduced to that of the solution.

In order to dissipate the heat of condensation and dilution, the absorber tank 28 is preferably cooled by a cooling loop driven by the pump 42. More about this cooling loop will be said later. Lowering the temperature of the absorber tank 28 increases the amount of refrigerant that will go into solution. Dissipating the heat developed in the absorber tank 28 as rapidly as possible encourages a greater flow rate of refrigerant from the evaporator 26. This, in turn, increases refrigeration capacity of the system. In general, it is always advantageous to use the lowest temperature absorber tank 28 cooling medium available.

Finally, a spray header 50 is used to increase the amount of refrigerant vapor absorbed from the evaporator 26. As illustrated in FIG. 1, a weak refrigerator-absorbent mixture from the bottom of the generator-analyzer 30 is sprayed into the absorber tank 28 via a spray header 50.

At this point, it is appropriate to say something about the various absorbent systems that may be used. Some absorption systems use water as the absorbent medium. Water has strong attraction for ammonia and satisfactorily separates from it when sufficient heat is supplied. When water is the absorbent, ammonia is usually used as the refrigerant. Both refrigerant and absorbent used in an absorption refrigeration cycle must have satisfactory and compatible characteristics. These are:

1. The temperature-pressure relationships should give practical pressures in the absorber tank 28 and the generator-analyzer 30;
2. A larger difference in vapor pressure should develop between the refrigerant and the absorbent to allow complete separation in the generator-analyzer 30;
3. High solubility should result at the conditions maintained in the absorber tank 28 and low solubility should result in the generator-analyzer 30 at the conditions maintained there; and
4. There should be satisfactory heat transfer, fluid flow and stability between the various components.

In addition to ammonia and an ammonia water combination, other combinations have been suggested.* These combinations include: Refrigerant 12 with ethyl ether of diethylene glycol acetate; methylene chloride with dimethyl ether of tetraethylene glycol; water with lithium chloride, ammonia with calcium chloride; ammonia with strontium chloride; Refrigerant 22 with dimethyl ether of tetraethylene glycol (DME-TEG also known as ANSUL Ether E-181), ammonia and lithium nitrite, and water and lithium bromide. Ammonia, methylene chloride, dimethyl ether of tetraethylene glycol and, of course, water are fluids, while the lithium salts, $LiNO_3$, $LiCl$ and $LiBr$, are solid under normal conditions. However, all three salts are highly soluble in the fluids with which they are used so that the resulting solution is a liquid.

*See R. M. Buffington, *Refrigeration Engineering*, Vol. 57 (1949), and W. R. Hainsworth, *Refrigeration Engineering*, Vol. 48 (1944).

GENERATOR-ANALYZER

The generator-analyzer 30 in the absorption system is the heat-energy source that brings and maintains the operating cycle. Its prime function is to generate conditions in which the absorbent readily separates from the refrigerant. The energy source, as shown in FIG. 1, is the hot exhaust gases ducted from the engine 16 via the exhaust manifold and pipe 24.

The details and the internals of the generator-analyzer 30 are shown in FIG. 2. The work performed by the absorber tank 28 and the generator-analyzer 30 is sometimes considered to be similar to the work done by the compressor of the vapor compression refrigeration system. The absorber tank 28, in a sense, compresses the refrigerant; the generator-analyzer 30 then heats the refrigerant and causes the high pressure in the cycle. The lower portion of the generator-analyzer 30 is the generator section 30A, and the upper portion of the generator-analyzer 30 is the analyzer section 30B. The generator 30A receives the strong solution of the refrigerant and absorbent from the absorber tank 28 by means of the pump 42. The recirculation or solution pump 42 increases the pressure in the generator-analyzer 30 to a level governed by elevation of the condenser 32 and the conditions maintained in the condenser 32.

The generator-analyzer 30 is formed by a pair of concentric cylinders, a central pipe and an insulated jacket. Specifically, the generator-analyzer 30 is formed by an outer cylinder 52, an inner cylinder 54, a central coaxial pipe 56 and a jacket 53 of insulation around the outer cylinder 52. The hot exhaust gases flowing from the engine 16, via the exhaust manifold and pipe 24, are ducted to the bottom or lower end 55 of the outer cylinder 52. The generator-analyzer 30 is supported by an inner frame 29 joined to the inner cylinder 54 and an outer frame 31 joined to the outer cylinder 52 and the jacket 53. These two support frames are joined to the body 10 of the truck. It should be noted that the outer jacket and cylinder only have to be as strong as the exhaust system while the inner cylinder is a pressure vessel able to withstand refrigeration system operating and test pressures.

The hot exhaust gases then flow either through the central heating pipe 56 or the annulus defined by the outer cylinder 52 and the inner cylinder 54. The two exhaust gas paths then merge together at the outlet 58 of the outer cylinder 52. From there, the exhaust gases pass to the muffler 60 (see FIG. 1). This portion of the central heating pipe 56 passing between the two ends of the inner cylinder 54 is provided with a series of circular fins 62. These fins 62 increase the heat transfer between the central heating pipe 56 and the inside of the inner cylinder 54.

The inner cylinder 54 is provided with a number of ports to join generator-analyzer 30 to the other components of the absorption refrigeration system. The solution pump 42 forces or transfers a relatively strong solution of refrigerant and absorbent from the absorber tank 28 to the analyzer section 30B of the generator-analyzer 30. Specifically, the fluid enters through a line 64 passing through a port 65 in the upper end of the inner cylinder 54. This fluid is effectively sprayed on the heating fins 62 at the upper end of the generator-analyzer 30. As the solution within the generator-analyzer 30 is heated, the refrigerant vapor is driven off, leaving behind a relatively weak solution. The weak solution, being heavier in weight than the strong solution, gravitates to the bottom of the generator 30A. The bottom of the generator 30A is in turn connected by a line 66 joined to the absorber tank 28 via the spray header 50. A second port 68 in the upper end of the inner cylinder 54 provides a penetration for the line 66 joining the bottom of the generator 30A with the absorber tank 28. Thus, the generator section 30A of the generator-analyzer 30 is a source of the weak liquor (i.e. a weak refrigerant-absorbent solution) used in the absorber tank 28 to absorb the refrigerant vapor as it comes from the evaporator 26. Because the generator-analyzer 30 is under high pressure and the absorber tank 28 is under low pressure, the spray header 50 maintains the pressure differential between the two. The concentration of refrigerant in the weak liquor solution returned to the absorber tank 28 is determined by the amount of heat added to the generator-analyzer 30. This is in accordance with the rule that the absorbing capacity of a solution varies as its temperature at a constant pressure.

The refrigerant and absorbent vapor are driven off from the strong solution within the generator-analyzer 30 during the heating process. As the vapors rise, they enter the analyzer section 30B at the upper end of the generator-analyzer 30. The analyzer 30B is primarily a fractionating or bubble tower. As the vapors rise in the analyzer 30B they are cooled. The higher boiling point absorbent vapor condenses and falls back to the generator section 30A. The refrigerant vapor continues to rise until it leaves at the top of the analyzer 30B to flow to the condenser 32. In this specific apparatus shown in FIG. 1, a leveling chamber 36 and a rectifier 38 are used to increase the amount of refrigerant vapor flowing to the condenser 32 by removing more of the absorbent vapor leaving the analyzer 30B. The absorbent vapor, condensing and falling back to the generator section 30A of the generator-analyzer 30 absorbs some of the refrigerant as it descends in the analyzer 30B. It also becomes mixed with the strong liquor solution bled from the high-pressure side of the main strong liquor line 64 entering through a port 64 at the top of the inner cylinder 54. This mixing process provides additional heating in the analyzer 30B. Therefore, the condensed solution vapor returns to the generator 30A in the form of a weak solution. The heat exchange in the analyzer 30B reduces both the generator 30A heat load and the condenser 32 cooling requirement. It should be noted that, in the process of vaporizing the refrigerant-absorbent mixture in the generator-analyzer 30, part of the absorbent vapor condenses on the upper fins 62 of the analyzer 30B. The strong refrigerant-absorbent mixture entering the upper end of the generator-analyzer 30 via a line 64 from the solution pump 42 sprays on these fins. Not only is the heat of dilution emitted through this spraying action, but also a scrubbing effect is produced between the rising mixture of refrigerant and absorbent vapors. This increases the amount of refrigerant vapor leaving the generator-analyzer 30 relative to the total amount of refrigerant vapor and absorbent vapor produced. Although only one spray line 64 is shown in FIG. 2, any number may be used to improve the operation of the generator-analyzer 30. A circular spray ring discharging onto the upper set of fins 62 will give a more uniform distribution in the generator 30B.

Returning to FIG. 1, in an effort to further reduce the amount of absorbent carried over to the condenser 32, a rectifier 36 is used. A rectifier 36 is, in effect, a solution-cooled pre-condenser (i.e. one separated from the main condenser 32). It does not have the capacity to condense any appreciable amount of refrigerant vapor. However, it does cause precipitation of the higher boiling point absorbent vapor remaining in the refrigerant-absorbent vapor leaving the analyzer 30B. This condensed absorbent vapor is returned to the analyzer 30B through a bleed-off line 70 in the form of a weak solution called "reflux". This reflux or return line 70 enters the generator-analyzer 30 at a port 72 located at the lower end of the inner cylinder 54. The open end of the reflux line 70 is located at a point intermediate the ends of the inner cylinder 54. By locating this line 70 in this position, the reflux solution is ducted away from the relatively weak refrigerant-absorbent mixture at the lower end of the generator-analyzer 30. This improves the relative concentration of weak refrigerant-absorbent mixture returned to the absorber tank 28 via the spray header 50.

Between the generator-analyzer 30 and the rectifier 38, a leveling chamber 36 is positioned. Specifically, the refrigerant-absorbent vapor leaving the analyzer section 30B of the generator-analyzer 30 flows through a pipe 74 into the top of the leveling chamber 36. Part of the absorbent vapor within the refrigerant-absorbent mixture condenses and returns to the generator-analyzer 30 through a return line 76. Two ports 75, 77 are located in the upper half of the inner cylinder 54 to accommodate these two lines 74, 76 leading to the leveling chamber 36. A higher concentration of refrigerant vapor in the refrigerant-absorbent vapor mixture then flows from the leveling chamber 36 to the rectifier 38. The line 78 joining the leveling chambers 36 with the rectifier 38 incorporates a loop seal so as to duct the vapor to the rectifier 38 without mixing with the condensed absorbent vapor in the leveling chamber 36. In addition, the loop seal insures that vapor enters the leveling chamber only via the line 74 from the top to the generator-analyzer 30. The refrigerant-absorbent vapor mixture leaving the rectifier 38 can be considered a relatively pure refrigerant vapor because it contains only a relatively negligible amount of absorbent vapor. The refrigerant vapor section of the rectifier 38 is joined to the condenser by a pipe 80.

CONDENSER

The function of the condenser 32 is to convert the refrigerant vapor to a liquid. It is similar in design and operation to those used in a vapor compression system. The condenser 32 is a heat exchanger that removes heat from the refrigerant vapor causing the vapor to condense to a liquid. As illustrated in FIG. 1, the condenser 32 is cooled by air passing from the front of the truck in the direction of the engine 16. When the truck is in motion, this cooling air is driven across the condenser by the motion of the vehicle. When the truck is standing still, the fan 82, used to cool the engine 16 and radiator 22, forces air across the condenser 32. Condensed liquid refrigerant forms at the bottom of the condenser where it, in effect, acts as a receiver, providing a supply of stored refrigerant liquid to be supplied to the evaporator 26. The flow of liquid refrigerant from the condenser 32 to the evaporator or eutectic plate 26 is governed by an expansion valve 34.

The expansion valve 34 reduces the pressure of the refrigerant as it passes from the high-pressure side of the system to the low-pressure side. Specifically, it is located between the condenser 32 and the evaporator 26.

ABSORBENT RECIRCULATION LOOP

The recirculation loop is formed by three heat exchangers and the solution pump joined in series. The solution pump 42 is preferably of the centrifugal variety. It serves to establish a pressure differential between the high side and the low side of the system. In doing so, it draws the strong solution from the absorber tank 28 and forces it, under pressure, into the generator-analyzer 30. The solution pump 42 can be conveniently located anywhere within the recirculation loop. However, it is preferably located at the coolest point in the system to insure an adequate amount of net positive suction head.

Installed in the strong liquor line, between the absorber tank 28 and the solution pump 42 is the absorber heat exchanger 40. The absorber heat exchanger cools the strong liquor flowing from the absorber tank 28. As was explained previously, lowering the temperature of the absorbent increases the amount of refrigerant that will go into solution within the absorber tank 28. The fluid flowing from the absorber heat exchanger 40 is discharged by the pump 42 into a rectifier heat exchanger 90. The rectifier heat exchanger removes heat from the refrigerant-absorbent mixture passed from the generator-analyzer 30. In doing so, a certain amount of the absorbent vapor within the rectifier 38 is condensed and the temperature of the strong liquor solution is increased. This improves the concentration of refrigerant vapor leaving the rectifier 38 and passing to the condenser 32. An absorber heat exchanger 92 is located between the rectifier heat exchanger 90 and the generator-analyzer 30. The strong refrigerant-absorbent mixture flowing from the rectifier heat exchanger 90 flows into the absorber heat exchanger 92 where it exchanges heat between the strong and weak liquor solutions. Thus, the temperature of the absorber tank 28 is lowered, and the temperature of the strong liquor flowing to the generator-analyzer 30 is decreased. This improves the thermal efficiency of the cycle. The strong refrigerant-absorbent mixture returns to the generator-analyzer 30 via a line 64 entering a port 65 in the top of the inner cylinder 54 and thus the cycle is completed.

In the continuous absorption refrigeration system just described, the high-pressure side varies from 200 to 300 psi, and the low-pressure side varies from 40 to 60 psi. All tanks and components in the system, including the inner cylinder 54 and the portion of the engine exhaust system 24 within the inner cylinder 54, are pressure vessels in the sense that they can stand or withstand the high pressure of the system expected during routine operation and testing.

OPERATION

The integrated operation of the various components just described will now be discussed in detail. Normally, if an eutectic plate storage system 26 were not employed, less refrigerant vapor enters the absorber tank 28 from the evaporator 26 when the heat load drops. However, the absorber tank 28 tends to continue the absorption process, thereby reducing the pressure in the evaporator 26. The lowering of the evaporator pressure in turn reduces the boiling point of the liquid refrigerant, contrary to the load demand change. One method of preventing a decrease in evaporator pressure is to throttle the line 94 leading to the absorber tank 28 from the evaporator 26. If the amount of weak liquor from the generator-analyzer 30 remains constant during the throttling period, the concentration of refrigerant in the strong liquor returning to the generator-analyzer 30 will diminish. This, however, upsets the balance of concentrations throughout the system. If this occurs, the heat supplied to the generator 30A becomes excessive relative to the amount needed. It is for this reason that changes in load demand are ordinarily met by controlling the quantity of weak liquor flowing to the absorber tank 28. Thus, only that amount of weak liquor necessary to absorb the lesser quantity of vapor produced and needed to maintain the maximum strong liquor concentration in the absorber tank 28 would be fed to the absorber tank 28.

However, the concentration of strong liquor is also governed by the amount of heat imparted to the system in the generator-analyzer 30. Therefore, it is usually necessary to adjust the heat input to the generator-analyzer 30 commensurate with the flow of weak liquor to the absorber tank 28 to maintain the balance of concentrations. By the installation of a eutectic plate storage system 26 in lieu of an ordinary evaporator, these load fluctuations, pressure differentials, and concentration variations are minimized if not completely eliminated so long as some of the eutectic solution remains frozen. In effect, the eutectic plates 26 and the generator analyzer 30 work to complement the energy variations of the system. Furthermore, by maintaining the pressure in the absorber tank 28 as high as possible, (commensurate with refrigeration temperature) the heat demand of the generator-analyzer 30 will be minimized. The particular design and arrangement of the absorbent recirculation loop previously described achieves this condition.

Recapitulating, with respect to an ammonia water system, as the liquid ammonia flows to the low pressure evaporator or eutectic holdover plates 26 some of it flashes to vapor. This action chills the remaining ammonia liquid which in turn removes heat from the refrigerated space 44. The pick-up of heat from the enclosure 20 causes more ammonia liquid to vaporize, causing a greater cooling effect. After the ammonia liquid has picked up heat in the eulectric holdover plates 26, ammonia vapor is attracted to the absorber tank 28 by the absorbent "pull" of water. Ammonia vapor combines with the adsorbent water to form a liquid mixture. The ammonia refrigerant is again in liquid form, and the liquid mix (ammonia and water solution) flows to the generator-analyzer 30.

In the generator-analyzer 30, it is heated until the mixture percolates, and the refrigerant (ammonia—now in the vapor state) separates from the absorbent (water). In a sense, ammonia is driven out of the water by the heat applied in the generator-analyzer 30. It is now under higher pressure than before it was heated.

Finally, the water absorbent returns to the absorber tank 28 and the refrigerant-ammonia vapor under pressure flows to the condenser 32. As heat is removed by the cooling action of air across the condenser coil 32, the ammonia vapor cools back to a liquid still under pressure. It then flows through a metering device 34 and flashes into the lower pressure chamber or evaporator 26 where, as a refrigerant-ammonia vapor, the cycle begins again.

Thus, it is apparent that there has been provided, in accordance with the invention, a unique absorption refrigeration system incorporating a novel generator-analyzer and a unique and efficient absorbent recirculation loop. Most significantly, the incorporation of an evaporation section using eutectic storage plates substantially improves system stability. Together, these devices act to minimize control problems resulting from refrigerant load changes and maximize the use of exhaust gas heat. While the invention has been described in conjunction with a specific embodiment, it is evident that many alternatives, modifications, and variations will be apparent to those skilled in the art in light of the foregoing description. Accordingly, it is intended to cover all such alternatives, modifications, and variations as set forth within the spirit and broad scope of the appended claims.

We claim:

1. A mobile refrigeration plant for use with a thermally insulated enclosure, comprising:
   (a) a frame supported by a set of wheels and driven by a heat engine mounted on said frame, hot exhaust gases from said heat engine being dishcarged through an exhaust pipe;
   (b) an eutectic solution cooling plate within said insulated enclosure, said plate containing a frozen fluid selected to maintain the temperature in said enclosure below a specified value;
   (c) an absorption refrigeration system carried by said frame, said absorption refrigeration system including: a condenser; a generator-analyzer thermal energy being supplied to said absorption system by said exhaust pipe gases transferring heat to said generator-analyzer; an absorber heat exchanger, heat being transferred from said condenser and from said absorber heat exchanger to the atmosphere with the absorber heat exchanger and condenser mounted adjacent said engine whereby when said engine is running, ambient air is forced across said condenser and said absorber heat exchanger; a rectifier; an absorber tank; an expansion valve; and a solution pump, said solution pump directing fluid flow from said absorber tank to said generator-analyzer via said absorber heat exchanger; and
   (d) exchange means for transferring thermal energy from said eutectic cooling place to said absorption refrigeration system via a fluid connection between the outlet of said expansion valve and said absorber tank whereby the temperature within said enclosure is maintained relatively constant and below said specified temperature despite the variation in engine load including complete shut down over a relatively long period of time; said generator analyzer comprising:
   i. a first cylinder having both ends covered;
   ii. a second cylinder having both ends covered with said first cylinder enclosed within and carried by said second cylinder, said first and said second cylinders defining a generally annular space between the walls of said cylinders and between the ends of each of said cylinders, said second cylinder defining an inlet port at one end and an outlet port at the other end, said hot exhaust gases being ducted to said inlet port and flowing from said outlet port;
   iii. a first tube, axially positioned along the length of said first and said second cylinders and passing through said first cylinder, ducting a portion of the exhaust gases flowing from said inlet port to said outlet port through said first cylinder, said first tube having a plurality of radial fins along its length, said fins transferring heat from the interior of said first tube to the interior of said first cylinder with at least one of said fins being located adjacent to the closed end of said first cylinder adjacent to the outlet port of said second cylinder, said fins forming evaporation sites and increasing the evaporation area of said first cylinder, the lower portion of said interior volume defining the generator section of said generator-analyzer, the upper portion of said interior volume defining the analyzer section of said generator-analyzer; said first cylinder defining:
   a first port used to join the interior of said first cylinder to a source of a relatively strong concentration of a refrigerant-absorbent solution, said first port spraying said strong refrigerant-absorbent solution upon at least one of said fins, said at least one of said fins increasing the impingement distance said spray droplets must tranverse before falling into the liquid phase of the refrigerant-absorbent solution within said first cylinder thereby reducing the carryover of absorbent flowing out of said generator section to said rectifier;
   a second port used to join the interior of said first cylinder to the vapor section of said rectifier;
   a third port used to join the interior of said first cylinder to the absorber tank of said refrigeration system, said third port ducting relatively weak refrigerant-absorbent solution from said generator section to said absorber tank; and
   a fourth port used to join the interior of said first cylinder to the condensed vapor flowing from said rectifier
   whereby the temperature of the relatively strong refrigerant-absorbent solution pumped to said generator-analyzer via said first port is raised by the heat emitted from said first tube, said fins and said first cylinder walls thereby evolving a gaseous mixture of refrigerant and absorbent, said gaseous mixture being free to pass upwardly to the top of said first cylinder and from there to said rectifier via said second port, said rectifier condensing an additional portion of said absorbent vapor, with the condensed absorbent vapor flowing back to said generator-analyzer via said fourth port while refrigerant vapor from said rectifier flows to said condenser.

2. The mobil refrigerant plant defined in claim 1, further including a jacket of insulation surrounding said second cylinder, said insulation confining the heat-energy of said exhaust gases to the interior of said second cylinder.

3. The mobil refrigeration plant defined in claim 1, wherein said third port is joined to the interior of said first cylinder via a second tube, said second tube having an open end at the lower end of said first cylinder whereby the relatively weak, low-temperature, refrigerant-absorbent solution at the lower end of said first cylinder is directed to said absorber tank with the concentration of said weak refrigerant-absorbent solution remaining relatively constant while being heated.

4. The mobil refrigeration plant defined in claim 1, wherein said fourth port is joined to the interior of said first cylinder via a third tube, said third tube having an open end at a point intermediate to the ends of said first tube whereby said additional portion of condensed absorbent vapor flowing back to said first cylinder is ducted away from the relatively weak low-temperature refrigerant and absorbent mixture at the lower end of said first cylinder.

5. The mobil refrigeration plant defined in claim 1, further including:
(a) a fifth port; and
(b) a leveling chamber, said leveling chamber having one opening joined to said second port; a second opening joined to said fifth port of said first cylinder; and a third port, joined to said rectifier, part of the absorbent in the refrigerant-absorbent vapor flowing from said first cylinder via said second port condensing and returning to said first cylinder via said fifth port whereby the concentration of refrigerant in said refrigerant-absorbent vapor flowing to said rectifier is increased.

6. The mobil refrigeration plant defined in claim 1, wherein said generator-analyzer is fluidly joined between said engine exhaust and the muffler for said engine.

* * * * *